April 14, 1925.
B. B. KAHN
TOASTER
Filed June 7, 1923
1,533,117
2 Sheets-Sheet 1
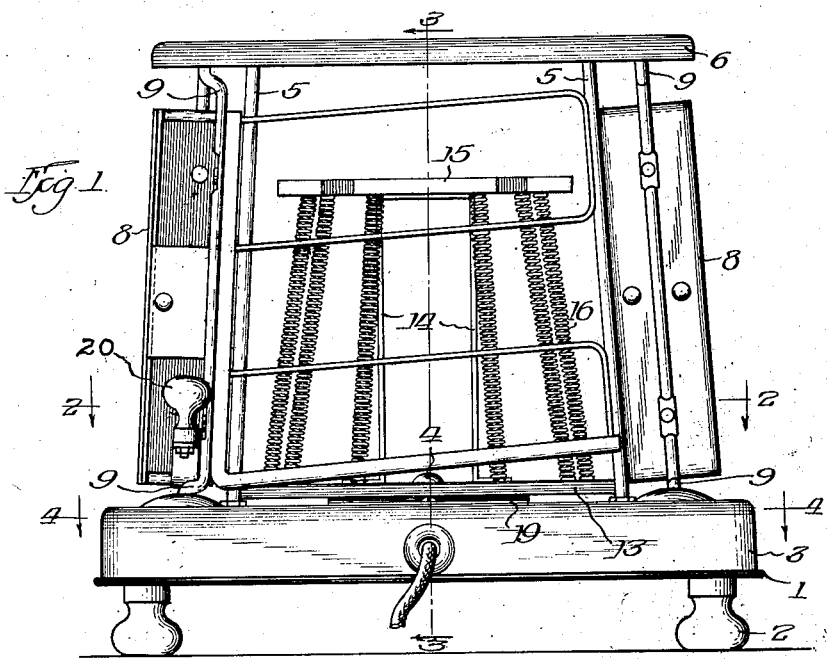
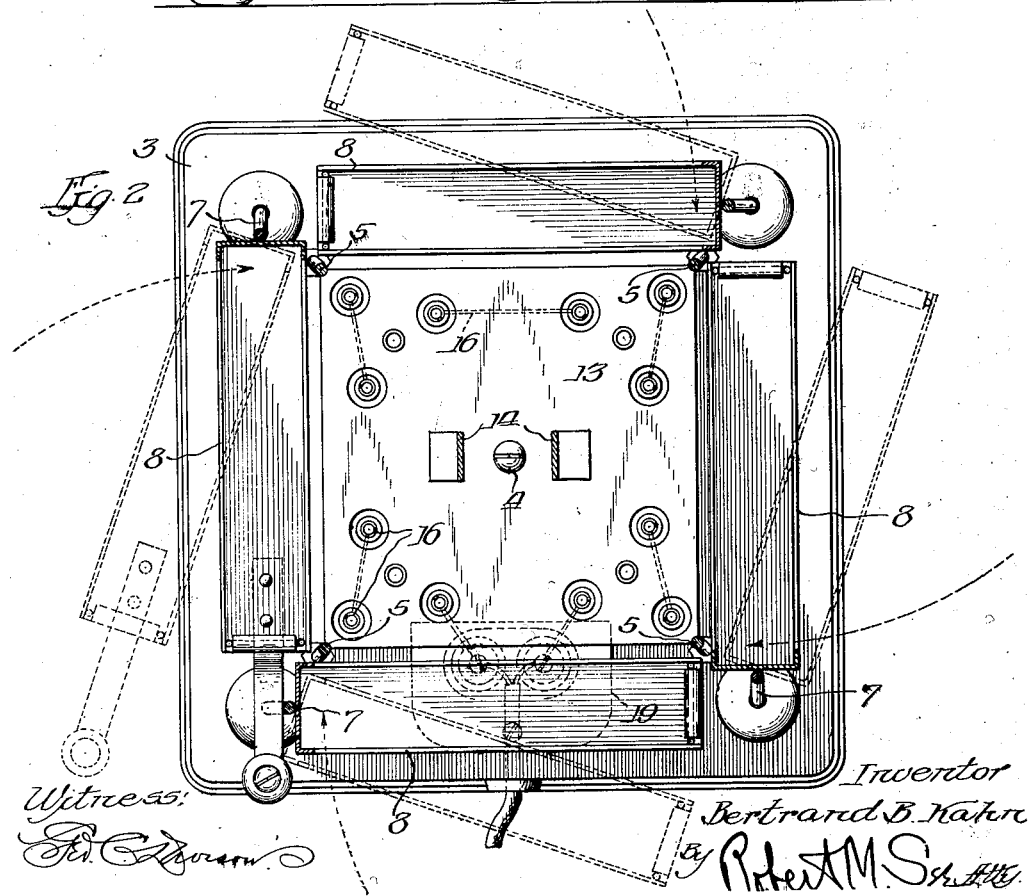
Inventor
Bertrand B. Kahn

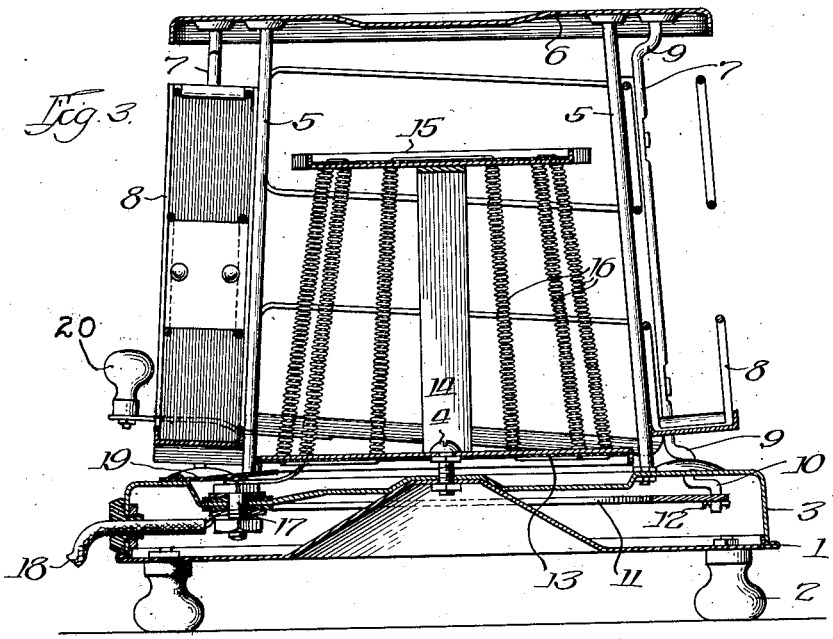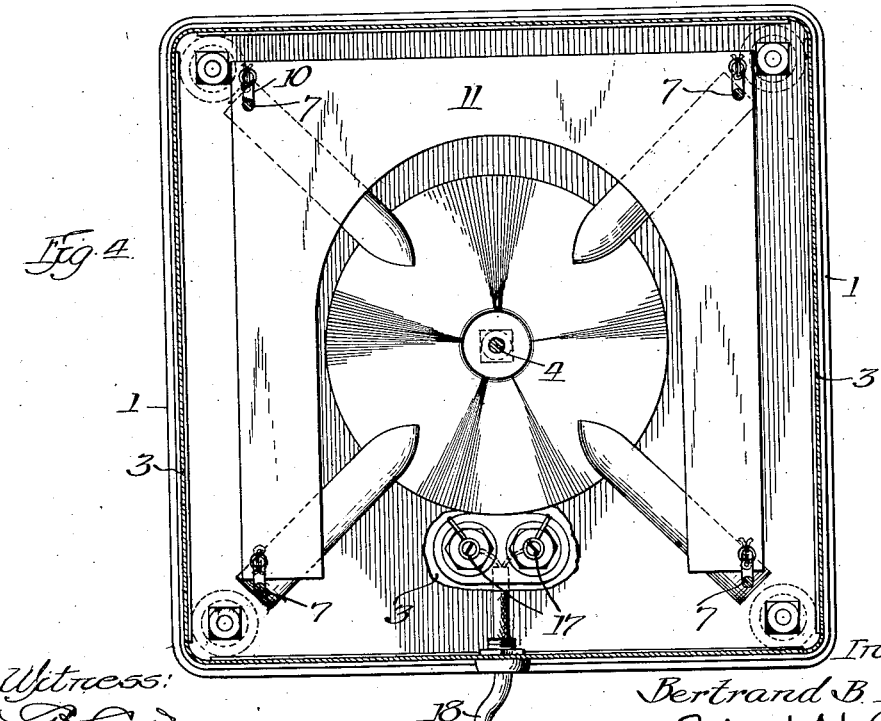

Patented Apr. 14, 1925.

1,533,117

UNITED STATES PATENT OFFICE.

BERTRAND B. KAHN, OF HAMILTON, OHIO, ASSIGNOR TO THE ESTATE STOVE COMPANY, OF HAMILTON, OHIO, A CORPORATION OF OHIO.

TOASTER.

Application filed June 7, 1923. Serial No. 643,987.

*To all whom it may concern:*

Be it known that I, BERTRAND B. KAHN, a citizen of the United States, residing at Hamilton, in the county of Butler and State of Ohio, have invented a certain new and useful Improvement in Toasters, of which the following is a full, clear, concise, and exact description, reference being had to the accompanying drawings, forming a part of this specification.

The present invention relates to toasters designed simultaneously to toast several slices of bread. Its principal object is the provision of means for swinging several slices of bread simultaneously so as to present to a heating element opposite sides of the slices. An additional object of the invention is to protect and conceal the operating mechanism and other parts of the toaster so that the toaster may be used and moved without liability of injury to the operating mechanism and so that it will be of pleasing appearance.

In the drawings, which illustrate a preferred embodiment of the invention,—

Figure 1 is an elevation of a toaster.

Figure 2 is a section on the line 2—2 in Figure 1.

Figure 3 is a section on the line 3—3 in Figure 1, and

Figure 4 is a section on the line 4—4 in Figure 1.

The toaster comprises a body or frame which includes a sheet metal bottom plate 1 provided with legs 2 and secured to a flanged plate 3 by a bolt 4. By this construction the toaster body is provided with a hollow base formed by the plates 1 and 3. A plurality of posts 5 secured at their lower ends to the plate 3 support a top plate 6 spaced above the base. The toaster body is polygonal, that is—it is designed to support a plurality of slices of bread so that the flat sides of the slices may be presented to a heating element supported on the base. Preferably the hollow base formed by the plates 1 and 3 and the top plate 6 are polygonal in correspondence with the general form of the toaster body and the arrangement of the slice holders when in toasting position.

Shafts 7 are journaled in the plate 3 and the top plate 6 at the several angles of the toaster body. Each shaft carries a slice holder 8 projecting laterally from the shaft so that in one position the slice holder will present one side of a slice to a centrally disposed heating element and so that when the shaft is rotated the holder will be swung around to present the opposite side of the slice to the heating element. The shafts 7 are offset, as at 9, near their upper and lower ends to limit vertical movement of the shafts in the plates 3 and 6. The lower ends of the shafts extend into the hollow base formed by the plates 1 and 3 and within the hollow base the shafts are formed with cranks 10. The cranks 10 are all of equal length and extend in the same direction and they are linked together by a plate 11 supported on the lower ends of the shafts by cotter pins 12. One of the slice holders is provided with a handle 20.

The heating element is preferably an electrical resistance coil. Accordingly a plate 13 is supported above the hollow base by the bolt 4 and a standard 14 secured to the plate 13 supports a plate 15 above the plate 13. A coil 16 is supported by and insulated from the plates 13 and 15. The coil 16 is connected with terminals 17 extending within the hollow base and a conductor 18 extends through one side of the base and is connected within the base with the terminals 17. The terminals 17 are secured to a depressed part of the plate 3 and an insulating plate 19 secured to the plate 3 extends inwardly over the terminals and under the plate 13.

Slices of bread are to be placed in the several holders and after they have been toasted on one side one of the holders is to be moved by the handle 20 until it is swung around to the adjacent side of the toaster body to present the opposite side of the slice to the heating element. Rotation of the shaft carrying the holder provided with the handle 20 causes its crank within the hollow base to produce simultaneous and equal rotation of all the shafts in the same direction. Consequently operation of the one holder automatically and simultaneously swings all of the holders to present the opposite sides of the slices to sides of the toaster body adjacent to the sides at which they were first positioned. The mechanism for operating the holders, as well as the terminals connecting the conductor and resistance coil, are enclosed within the hollow base so that they are protected from injury and so that the complete toaster is very pleasing in appearance.

Having thus described my invention, what I claim as new and desire to secure by Letters Patent of the United States is:—

1. In a toaster, the combination of a body having means to supply heat for toasting, a plurality of shafts journaled in the body, slice-holders secured to the several shafts and adapted on rotation thereof to present opposite sides of slices to the heating means, cranks of equal length extending in the same direction from the several shafts, and a member linking the cranks together.

2. In a toaster, the combination of a body having a hollow base and having means to supply heat for toasting above the base, a plurality of shafts journaled in the body and extending into the base, slice-holders secured to the several shafts and adapted on rotation thereof to present opposite sides of slices to the heating means, a handle for rotating one of the shafts, and means within the hollow base for causing rotation of the one shaft to rotate the other shaft or shafts uniformly and simultaneously.

3. In a toaster, the combination of a body having a hollow base and having means to supply heat for toasting above the base, a plurality of shafts journaled in the body and extending into the base, slice-holders secured to the several shafts and adapted on rotation thereof to present opposite sides of slices to the heating means, a handle for rotating one of the shafts, cranks of equal length extending in the same direction from the several shafts within the base, and a member within the base linking the cranks together.

4. In a toaster, the combination of a hollow base, a top supported above the base, heat supplying means supported on the base, a plurality of shafts having their ends journaled in the base and top, slice-holders secured to the several shafts and adapted on rotation thereof to present opposite sides of slices to the heating means, cranks of equal length extending in the same direction from the several shafts within the base, and a member within the base linking the cranks together.

5. In a toaster, the combination of a polygonal body including a hollow base, and a top supported above the base, a heat supplying means supported on the base, a plurality of shafts having their ends journaled in the base and top at the angles of the body, slice-holders projecting laterally from the shafts, a handle for rotating one of the shafts, cranks of equal length extending in the same direction from the several shafts within the base, and a member within the base linking the cranks together.

6. In a toaster, a polygonal body forming a truncated pyramid and including a hollow base and a top supported in spaced relation to the base, means to supply heat outwardly from each side, a plurality of shafts having their ends journaled in the base and top at the corners of the body, bread slice holders secured to the shafts at points displaced in the same relative direction from the axis of the journals of their respective shafts, a U-shaped member within the base linking the ends of all of said shafts, and means to turn one of said slice holders.

In witness whereof, I hereunto subscribe my name this 3d day of May, 1923.

BERTRAND B. KAHN.